(12) United States Patent
Papin et al.

(10) Patent No.: US 9,945,261 B2
(45) Date of Patent: Apr. 17, 2018

(54) CASING SUPPORT STRUCTURE

(71) Applicant: SNECMA, Paris (FR)

(72) Inventors: Thierry Georges Paul Papin, Varennes-Jarcy (FR); Kaelig Merwen Orieux, Fontaine le Port (FR); Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 225 days.

(21) Appl. No.: 14/945,784

(22) Filed: Nov. 19, 2015

(65) Prior Publication Data
US 2016/0146054 A1 May 26, 2016

(30) Foreign Application Priority Data

Nov. 24, 2014 (FR) ..................................... 14 61325

(51) Int. Cl.
*F01D 25/24* (2006.01)
*F01D 25/28* (2006.01)
*F01D 25/16* (2006.01)

(52) U.S. Cl.
CPC ............ *F01D 25/28* (2013.01); *F01D 25/162* (2013.01); *F01D 25/24* (2013.01); *Y02T 50/672* (2013.01)

(58) Field of Classification Search
CPC ......... F01D 25/24; F01D 25/28; F01D 25/162
See application file for complete search history.

(56) References Cited

U.S. PATENT DOCUMENTS

| 4,820,117 A | 4/1989 | Larrabee et al. |
| 4,987,736 A * | 1/1991 | Ciokajlo ................ F01D 9/065 |
| | | 415/138 |

(Continued)

FOREIGN PATENT DOCUMENTS

| EP | 0 298 898 A2 | 1/1989 |
| FR | 2 956 875 A1 | 9/2011 |
| WO | WO 2013/095211 A1 | 6/2013 |

OTHER PUBLICATIONS

French Preliminary Search Report dated Oct. 14, 2015 in French Application 14 61325, filed on Nov. 24, 2014 (with English Translation of Category of Cited Documents).

*Primary Examiner* — Justin Seabe
(74) *Attorney, Agent, or Firm* — Oblon, McClelland, Maier & Neustadt, L.L.P.

(57) ABSTRACT

A support structure suitable for interposing between the engine and the nacelle of an aeroengine and suitable for being fastened on an intermediate casing is provided. The structure includes a shroud having a plurality of sectors, a plurality of radial arms each installed between two adjacent shroud sectors, and a plurality of fasteners for fastening the plurality of shroud sectors to the plurality of radial arms. The shroud sectors and radial arms form a skeleton for transmitting structural forces within the intermediate casing. The structure includes non-structural fairings mounted on the skeleton and suitable for reconstituting the airflow passage. Each of the shroud sectors and radial arms is formed by a metal frame without mechanical discontinuity, each shroud sector metal frame defining at least one opening that is closed by a cover and each radial arm metal frame defining at least one orifice for receiving a closure plate.

12 Claims, 1 Drawing Sheet

(56) References Cited

U.S. PATENT DOCUMENTS

| | | | | |
|---|---|---|---|---|
| 5,357,744 | A * | 10/1994 | Czachor | F01D 9/065 415/134 |
| 7,377,098 | B2 * | 5/2008 | Walker | F01D 9/065 184/6.11 |
| 2011/0073745 | A1 * | 3/2011 | Duchatelle | F01D 9/04 248/637 |
| 2013/0224011 | A1 | 8/2013 | Hashimoto | |
| 2014/0373556 | A1 | 12/2014 | Aronsson et al. | |

\* cited by examiner

CASING SUPPORT STRUCTURE

BACKGROUND OF THE INVENTION

The present invention relates to the field of aeroengines, e.g. turbojets, and it relates more particularly to a support structure interposed between the engine and the nacelle.

In known manner, in addition to providing a mechanical junction between the engine and the nacelle, such a support structure needs to ensure:
- continuity of the airflow passage for the secondary (by-pass) stream;
- passages and supports for services (which may be electrical, mechanical, hydraulic) between the various components of the engine (core, fan, etc., . . . ) and the nacelle of the engine;
- fire protection between the various compartments of the engine and the secondary stream; and
- accessibility to pieces of equipment and to services for maintenance purposes.

The support structure is constituted by a cylindrical frame that is sectorized (to have shroud sectors) and of narrow width (of the order of a few hundreds of millimeters along the axis of the engine), having covers that give easy access to the pieces of equipment they hide once the nacelle has been opened, and having a plurality of arms that are distributed regularly around the frame. Conventionally, the frame supports scoops of the air bleed system (booster variable bleed valves (VBVs)) and is designed to be fastened to the intermediate frame, which is itself constituted by a hub, a shroud, structural arms, and structural outlet guide vanes (OGVs).

With present-day technologies, the structural support has a fairing structure for giving access to pieces of equipment and also for reconstituting the airflow passage, such that its aerodynamic skin must also provide the assembly with mechanical strength. This leads to considerable weight since the aerodynamic surface of the support structure needs to be made of metal, generally as a casting given its complex shape, and it also needs to be relatively thick in order to be capable of being fabricated.

Since maintenance times need to be optimized, the present frame is seen as an obstacle to accessing pieces of equipment that it covers, which pieces of equipment must be capable of being removed, changed, verified, . . . during field maintenance, in a length of time that is limited and depends on the application, where the time required needs to take account of the time for disassembling and reassembling the frame itself.

There thus exists a need for a support structure is arranged more particularly between the hub of the intermediate casing and the shroud of the intermediate casing, and that enables easy access to be provided to such pieces of equipment (i.e. by improving time required to access them) while also providing a significant saving in weight and a reduction in the disturbances in the airflow passage.

OBJECT AND SUMMARY OF THE INVENTION

A main object of the present invention is thus to mitigate such drawbacks by proposing a support structure suitable for interposing between the engine and the nacelle of an aeroengine and suitable for being fastened on an intermediate casing, the structure comprising a shroud having a plurality of sectors, a plurality of radial arms each installed between two adjacent shroud sectors, and a plurality of fastener means for fastening said plurality of shroud sectors to said plurality of radial arms, said shroud sectors and radial arms forming a skeleton suitable for transmitting structural forces within said intermediate casing, the support structure being characterized in that it comprises non-structural fairings mounted on said skeleton and suitable for reconstituting the airflow passage, and in that each of said shroud sectors and radial arms is formed by a metal frame without mechanical discontinuity, each shroud sector metal frame defining at least one opening that is closed by a cover and each radial arm metal frame defining at least one orifice for receiving a closure plate.

Thus, by dissociating the structural portion and the aerodynamic portion, a support structure is obtained of mass that is considerably reduced, while also achieving better distribution of loads. In addition, accessibility and maintenance of nearby parts can be improved.

Preferably, said skeleton is a metal frame without mechanical discontinuity and said non-structural fairings are made of stamped thin metal sheets or of composite materials.

Advantageously, said skeleton comprises at least two shroud sectors separated by at least two radial arms.

Preferably, covers and plates include countersinks for passing each screw so that a head of each screw becomes positioned therein exactly so as to be in alignment with the top faces of the covers and plates, thereby ensuring aerodynamic continuity for the air stream.

Advantageously, said plurality of fastener means is made up of a first set of screws passing both through said shroud sector metal frames and through said radial arm metal frames, said radial arm metal frames being fastened radially in said intermediate casing by means of a second set of screws passing through respective platforms of said radial arm frames, and said shroud sector metal frames being fastened axially in said intermediate casing by means of a third set of screws passing through peripheral edges of said shroud sector frames.

Preferably, said first, second, and third sets of screws are of the "captive" type.

The invention also provides any aeroengine including a support structure as specified above.

BRIEF DESCRIPTION OF THE DRAWING

Other characteristics and advantages of the present invention appear from the following description made with reference to the accompanying drawing, which show an embodiment having no limiting character. In the figures.

DETAILED DESCRIPTION OF AN EMBODIMENT

A support structure interposed between the engine and the nacelle of an aeroengine, typically a turbojet, and that is fastened to the intermediate casing of the turbojet is conventionally in the form of a shroud with radial arms secured between its sectors.

The invention consists in dissociating the mechanical strength that is provided by a 360° skeleton without mechanical discontinuity for the purpose of transmitting structural forces, and the aerodynamic function which is provided by non-structural fairings fastened to the skeleton. Since the fairings no longer have any mechanical function, they can be considerably lightened.

In the invention, the shroud sectors and the radial arms are thus formed as two independent portions, a skeleton 10 suitable for transmitting structural forces in the intermediate casing, and non-structural fairings 20, 22 that are mounted on the skeleton and that are suitable for reconstituting the airflow passage. In the example shown, the structure has four sectors mounted between four arms, however depending on the circumference of the engine or on the positions of piece of equipment such as variable bleed valves (VBVs) or variable stator vanes (VSVs), for example, the shroud could have a minimum of two sectors mounted between two arms and may have as many six sectors mounted between six arms.

Figure 2:
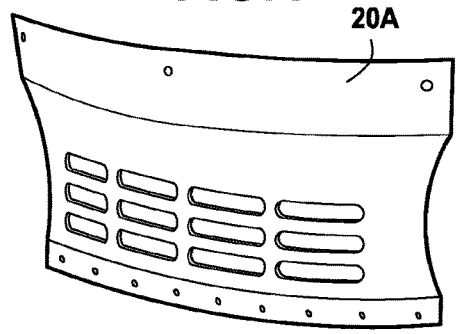
FIG. 2 shows the FIG. 1 skeleton fastened on an intermediate turbine engine casing.
Figure 2:
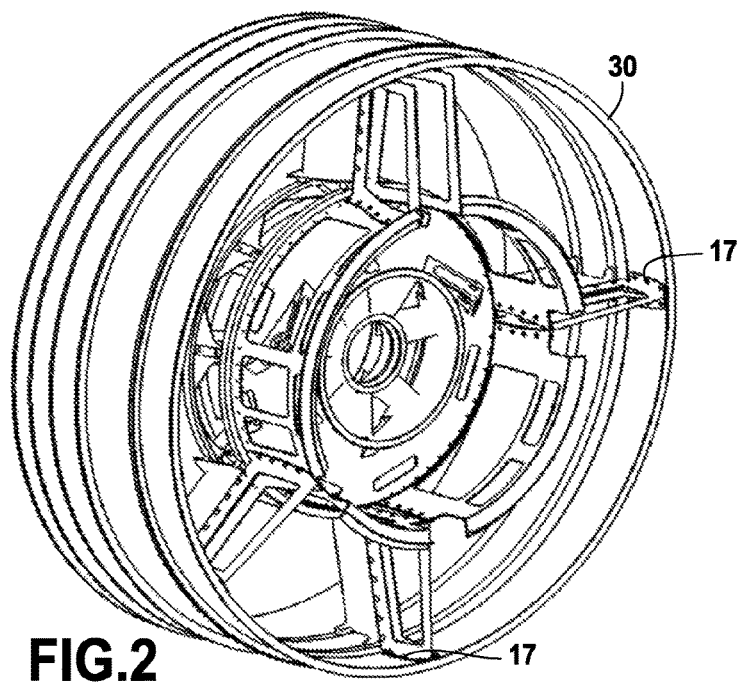

In the example shown, the skeleton is a metal frame made up of eight distinct parts without mechanical discontinuity, the parts being assembled together by screwing, each part corresponding to a particular shroud sector 12A, 12B, 12C, 12D or to a particular radial arm 14A, 14B, 14C, 14D of the support structure. Thus, by way of example, the frame of the shroud sector 12A is secured to the frame of the radial arm 14A by means of a first set of screws 16 passing both through a transverse edge of the frame of the shroud sector and a rim of the frame of the radial arm. In order to obtain better distribution of forces within the intermediate casing (referenced 30 in FIG. 2), each free end of the radial arm frames has a platform enabling the skeleton to be fastened to the intermediate casing by a second set of screws 17, the shroud sectors being held axially in the intermediate casing by means of a third set of screws 18 passing through the peripheral edge of the frame of each of the shroud sectors. These screws are preferably of the "captive" type in order to reduce the time required by an operator to assemble and/or disassemble the fairings.

Figure 1:
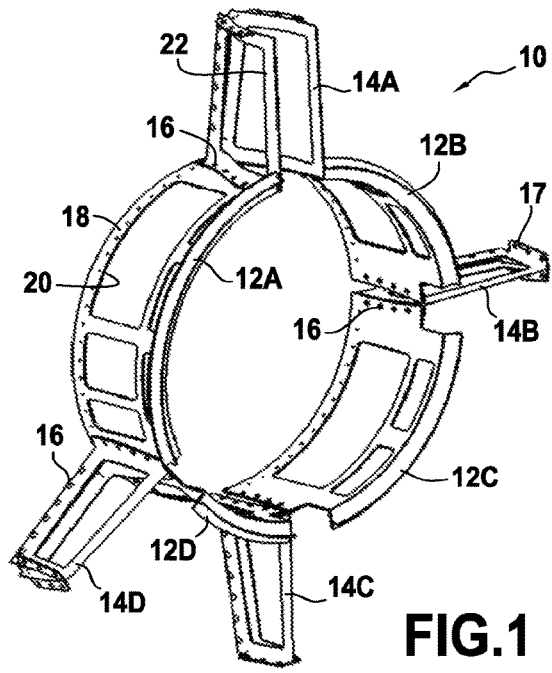
FIG. 1 is a perspective view of a skeleton of a support structure in accordance with the invention.
Figure 4:
FIG. 4 shows a cover for fastening on the FIG. 1 skeleton on one of its shroud sectors.
Figure 3:
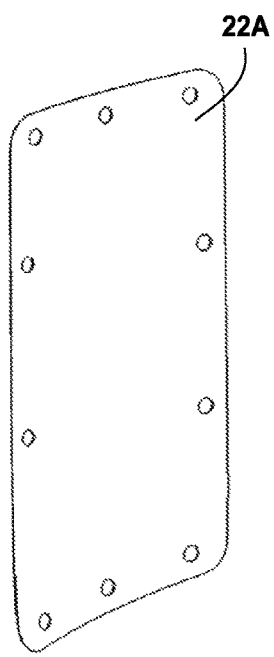
FIG. 3 shows a plate for fastening to the FIG. 1 skeleton on one of its radial arms.

Each shroud sector frame defines at least one opening 20, e.g. acting as a scoop for one of the air bleed systems of the aeroengine, with the cover 20A thereof being shown in FIG. 4, and each radial arm frame defines at least one orifice 22 for receiving a closure plate 22A, as shown in FIG. 3.

In order to ensure aerodynamic continuity for the secondary stream, the covers and plates are mounted in setbacks in the frame of dimensions (length, width, height) that correspond to the shape of the cover, thus making it possible to bring the top faces of these fairings into alignment flush with the top face of the frame, so as to avoid constituting an obstacle for the secondary air stream. Likewise, the covers and the plates have countersinks for passing each of the screws so that the head of each screw is positioned exactly and is then in alignment flush with the top faces of these covers and plates and thus also with the top faces of the shroud sectors or of the radial arms. It may be observed that the dimensions of the screw heads determine the depth of the countersinks, thereby constituting a constraint that needs to be taken into account when determining the thickness of the fairings.

The invention makes accessibility more simple. It is thus possible to remove the covers without touching a structural portion of the shroud. In addition, harnesses, such as VBV pipework or ducts, that previously used to drop out as soon as a cover was removed can now be fastened in simple manner to the skeleton.

The invention claimed is:

1. A support structure suitable for interposing between the engine and the nacelle of an aeroengine and suitable for being fastened on an intermediate casing, the structure comprising:
    a shroud having a plurality of sectors, each shroud sector including a circumferential surface extending circumferentially between ends of each shroud sector;
    a plurality of radial arms each installed between two adjacent shroud sectors; and
    a plurality of screws which fasten said plurality of shroud sectors to said plurality of radial arms, said shroud sectors and radial arms forming a skeleton suitable for transmitting structural forces within said intermediate casing,
    wherein the support structure comprises non-structural fairings mounted on said skeleton and suitable for reconstituting an airflow passage,
    wherein each of said shroud sectors and radial arms is formed by a metal frame without mechanical discontinuity, each shroud sector metal frame defining at least one opening that is closed by a cover and each radial arm metal frame defining at least one orifice for receiving a closure plate, and
    wherein the at least one opening of each shroud sector metal frame is provided on the circumferential surface of the shroud sector.

2. The support structure according to claim 1, wherein said non-structural fairings are made of stamped thin metal sheets or of composite materials.

3. The support structure according to claim 1, wherein said skeleton includes at least two shroud sector metal frames separated by at least two radial arm metal frames.

4. The support structure according to claim 1, wherein covers and plates include countersinks for passing each screw so that a head of each screw becomes positioned therein exactly so as to be in alignment with top faces of the covers and plates, thereby ensuring aerodynamic continuity for the airflow passage.

5. The support structure according to claim 1, wherein the screws include a first set of screws passing both through said shroud sector metal frames and through said radial arm metal frames.

6. The support structure according to claim 1, wherein said radial arm metal frames are fastened radially in said intermediate casing by a second set of screws passing through respective platforms of said radial arm metal frames.

7. The support structure according to claim 1, wherein said shroud sector metal frames are fastened axially in said intermediate casing by a third set of screws passing through peripheral edges of said shroud sector metal frames.

8. The support structure according to claim 5, wherein each screw of said first set of screws is a captive screw.

9. The support structure according to claim 6, wherein each screw of said second set of screws is a captive screw.

10. The support structure according to claim 7, wherein each screw of said third set of screws is a captive screw.

11. An aeroengine including a support structure according to claim 1.

12. The support structure according to claim 1, comprising four shroud sectors, and the circumferential surface of each shroud sector includes three openings.

* * * * *